US012808467B2

(12) United States Patent
Becerra Alvarado et al.

(10) Patent No.: US 12,808,467 B2
(45) Date of Patent: Nov. 24, 2026

(54) FERRULE SYSTEM

(71) Applicant: Jameson, LLC, Clover, SC (US)

(72) Inventors: Carlos Fernando Becerra Alvarado, Charlotte, NC (US); Timothy James Beed, Lake Wylie, SC (US)

(73) Assignee: Jameson, LLC, Clover, SC (US)

( * ) Notice: Subject to any disclaimer, the term of this patent is extended or adjusted under 35 U.S.C. 154(b) by 228 days.

(21) Appl. No.: 18/523,206

(22) Filed: Nov. 29, 2023

(65) Prior Publication Data

US 2024/0175525 A1 May 30, 2024

Related U.S. Application Data

(60) Provisional application No. 63/385,470, filed on Nov. 30, 2022.

(51) Int. Cl.
*F16L 21/08* (2006.01)

(52) U.S. Cl.
CPC .................................... *F16L 21/08* (2013.01)

(58) Field of Classification Search
CPC ........ F16B 7/0406; F16B 7/042; F16B 21/06; F16B 21/12; F16B 2200/10; B25G 3/12; B25G 3/18
See application file for complete search history.

(56) References Cited

U.S. PATENT DOCUMENTS 4,329,078 A * 5/1982 Crates ..................... F16B 7/042 403/329
5,090,837 A * 2/1992 Mower ................... F16L 37/02 403/361
5,288,161 A 2/1994 Graves et al.
5,547,305 A 8/1996 Treche
5,564,852 A 10/1996 Maxwell et al.
7,004,671 B2 * 2/2006 Tawara ................. F16B 7/0426 403/379.5
9,169,664 B2 * 10/2015 Shiraishi ................. E04H 15/48
9,185,851 B2 11/2015 Miyawaki
2010/0281642 A1 11/2010 Lee
2011/0002732 A1 1/2011 Su
(Continued)

OTHER PUBLICATIONS

Non-Final Office Action, dated May 28, 2026, issued in related application, U.S. Appl. No. 19/231,221, 28 1 pages; provided herein per MPEP 609.04(a)III.

*Primary Examiner* — Amber R Anderson
*Assistant Examiner* — Almutasim Hezam Aiyash
(74) *Attorney, Agent, or Firm* — Shumaker, Loop & Kendrick, LLP; S. Alexander Long, Jr.; Brian D. MacDonald

(57) ABSTRACT

A male ferrule includes a insertion end, a second end opposite the insertion end, and an insertion stop defined by a diametric enlargement between the insertion end and the second end. The male ferrule includes a cylindrical portion between the insertion end and the insertion stop. A female ferrule is configured to receive the insertion end of the male ferrule, the female ferrule having a leading edge that abuts the insertion stop of the male ferrule at full insertion. A lock pin locks the coupling at full insertion. The insertion end of the male ferrule moves the lock pin from its locking position. A spring biases the lock pin into the locking position. The insertion end of the male ferrule moves the lock pin from its locking position against a force of the spring.

9 Claims, 3 Drawing Sheets

(56) References Cited

U.S. PATENT DOCUMENTS

| | | | |
|---|---|---|---|
| 2017/0051521 | A1 | 2/2017 | Bridges |
| 2017/0211614 | A1 | 7/2017 | Knight |
| 2019/0199072 | A1 | 6/2019 | Tuchscherer et al. |
| 2020/0254603 | A1 | 8/2020 | Murrow, Jr. |
| 2022/0364379 | A1 | 11/2022 | Su |
| 2023/0191585 | A1 | 6/2023 | Cobian-Mendez |

* cited by examiner

FERRULE SYSTEM

CROSS-REFERENCE TO RELATED APPLICATIONS

This non-provisional patent application claims the priority of U.S. Provisional Application No. 63/385,470, filed Nov. 30, 2022, entitled "Ferrule System," the entirety of which is hereby incorporated by reference.

TECHNICAL FIELD

The present disclosure relates to connectors for joining rods and posts at their ends. More particularly, the present disclosure relates to an improved ferrule system.

BACKGROUND

Ferrule systems, having male and female components, are used to couple host structures such as posts, rods, tools, and other items to which the male and female components are respectively mounted. Ferrules are used for their convenience, and thus should be intuitively used and should work with some degree of autonomy once a mating pair is brought into contact for engagement, particularly in applications where a user is multi-tasking or cannot reach the junction of the two parts with both hands.

Improved ferrule systems are needed.

SUMMARY

This summary is provided to briefly introduce concepts that are further described in the following detailed descriptions. This summary is not intended to identify key or essential features of the claimed subject matter, nor is it to be construed as limiting the scope of the claimed subject matter.

According to at least one embodiment, a ferrule system includes a male ferrule, and in some examples, a female ferrule. The male ferrule includes an insertion end having a tapered tip, a second end opposite the insertion end for mounting the male ferrule onto a host structure, and an insertion stop between the insertion end and the second end, the insertion stop defined by a diametric enlargement relative to a greatest diameter of the insertion end.

The insertion end of the male ferrule may include a cylindrical portion between the tapered tip and the insertion stop.

In some examples, a female ferrule is configured to receive the insertion end of the male ferrule, the female ferrule having a terminal proximal edge that abuts the insertion stop of the male ferrule at full insertion of the insertion end.

In some examples, the ferrule system includes a lock pin by which the male ferrule and female ferrule are automatically locked into coupling at full insertion of the insertion end.

During insertion of the insertion end of the male ferrule into the female ferrule, the insertion end of the male ferrule may automatically move the lock pin from a locking position.

The lock pin may have a round contact terminus configured to slide along the along the insertion end of the male ferrule as the male ferrule advances toward full insertion of the insertion end into the female ferrule.

A spring may bias the lock pin into the locking position, and during insertion of the insertion end of the male ferrule into the female ferrule, the insertion end of the male ferrule may automatically move the lock pin from its locking position against a force of the spring.

The tapered tip of the male ferrule may have a leading edge diameter and diametrically increase to the cylindrical portion thereby defining an insertion slope that automatically pushes the lock pin radially outward as the male ferrule advances toward full insertion of the insertion end into the female ferrule.

The tapered tip of the male ferrule may be frustoconical in shape.

The cylindrical portion of the male ferrule may define the greatest diameter of the insertion end.

The insertion stop may be frustoconical in shape.

The second end of the male ferrule may be cylindrical and define a greatest diameter of the male ferrule.

The lock pin may have a contact terminus configured to slide along the insertion slope of the tapered tip as the male ferrule advances toward full insertion of the insertion end into the female ferrule.

The contact terminus may be rounded.

The contact terminus may be hemispherical.

The male ferrule may have a lock hole for receiving the lock pin in the locking position.

The lock hole may be defined in the cylindrical portion of the insertion end of the male ferrule.

The spring may include a spring clip attached to the female ferrule, the spring clip carrying the lock pin.

The spring clip may have an end portion formed as a hook by which the spring clip can be pulled radially outward against the bias force thereby disengaging the lock pin from the lock hole.

The female ferrule may include a clearance hole through which the lock pin is extended in the locking position thereof.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
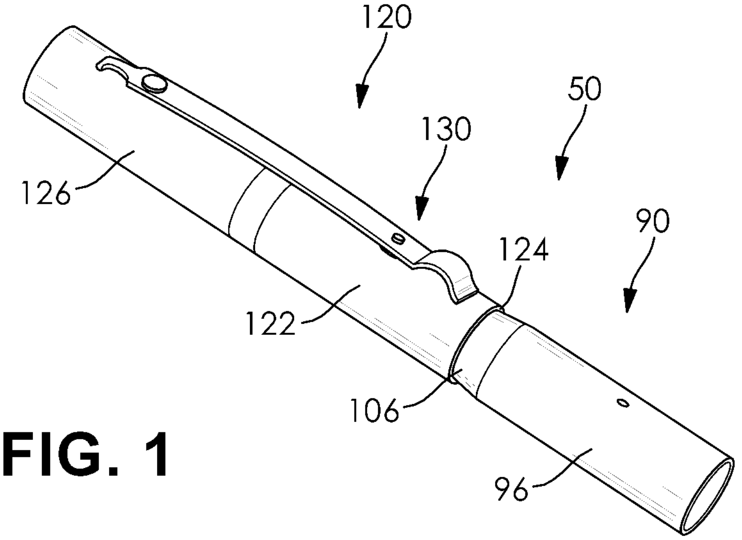
FIG. 1 is a perspective view of a ferrule joint system according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Figure 2:
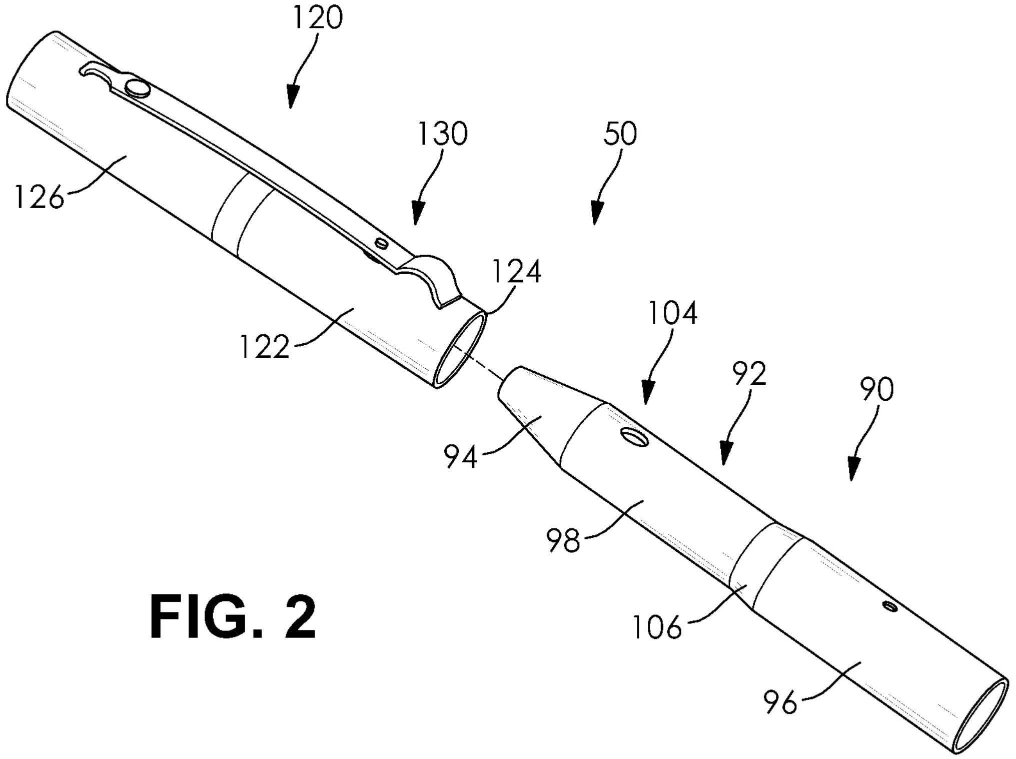
FIG. 2 is a an exploded perspective view of the ferrule joint system of FIG. 1, showing the male and female ferrules thereof uncoupled.
Figure 3:
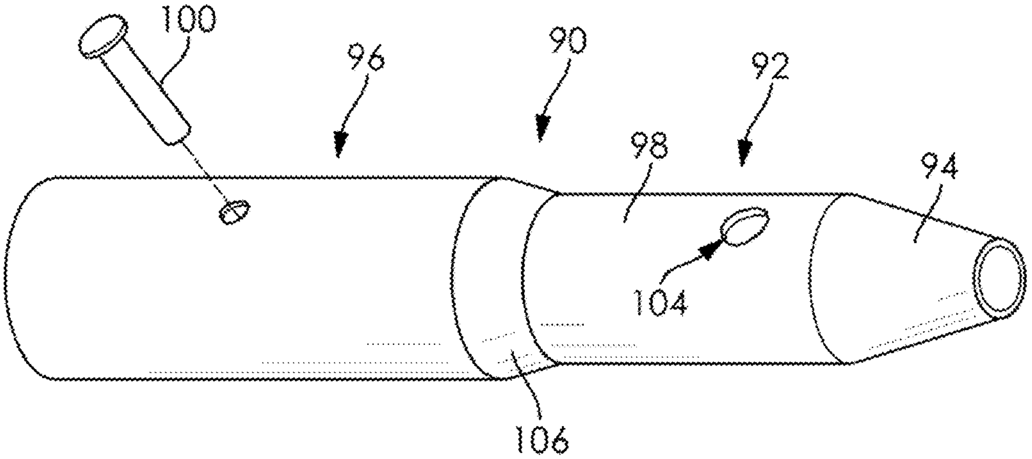
FIG. 3 is a perspective view of the inventive male ferrule of FIG. 2.
Figure 4:
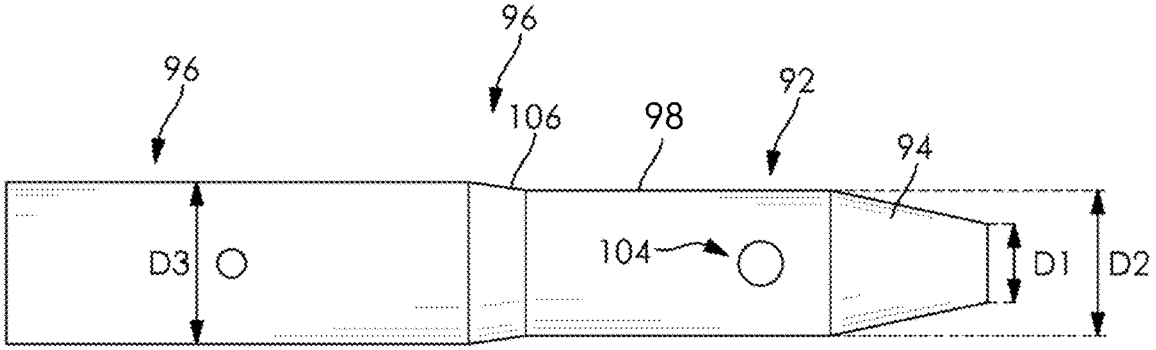
FIG. 4 is a side view of the male ferrule of FIG. 2.
Figure 5:
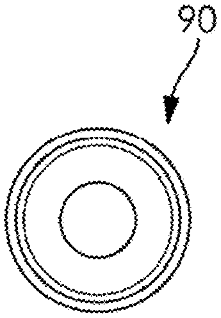
FIG. 5 is a longitudinal end view of the male ferrule of FIG. 2, showing the open end for receiving a tool or equipment post or shank for mounting the ferrule.
Figure 6:
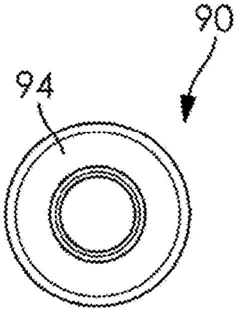
FIG. 6 is a longitudinal end view of the male ferrule of FIG. 2, showing the insertion end for coupling with the female ferrule of FIGS. 1-2.

An inventive ferrule joint system 50, according to the embodiment of FIGS. 1-2, provides a releasable locking connection of the two mating parts, termed herein a male ferrule 90 and a female ferrule 120. Each is configured to be mounted on a respective host structure, such as a pole, tool, or other accessory, for use in connecting two structures together by way of the ferrule joint system 50 without requiring expertise or much force to actuate a connection correctly. In use, an insertion end 92 of the male ferrule 90 is manually inserted into the female ferrule 120 and is locked in place by an automatically locking and manually releasable latch 130 including a lock pin 132 (FIG. 9) carried by the female ferrule 120. The lock pin 132 is automatically inserted into a lock hole 104 (FIGS. 2-4) in the male ferrule 90 when their alignment is achieved. Locking is maintained by the latch 130, which exerts enough force so the pin will not be released unintentionally.

The insertion end 92 of the male ferrule 90 has a frustoconical tapered tip 94 and a cylindrical portion 98. A distal end 96 of the male ferrule opposite the insertion end 92 is cylindrical and diametrically enlarged in relation to a cylindrical portion 98. The distal end 96 receives or is otherwise connected to an end portion of a host structure in use and retained there by a laterally inserted fastener 100 (FIG. 3), illustrated as a bolt or rivet. The cylindrical portion 98 of the insertion end 92 of the male ferrule 90 extends from the tapered tip 94 toward the distal end 96. The cylindrical portion 98 of has the lock hole 104 for receiving the lock pin 132 carried by the female ferrule 120. The tapered tip 94 has a small leading edge diameter D1 and diametrically increases to the cylindrical portion 98, thus defining an insertion slope. The leading edge diameter D1 is small enough to clear the radially inward end of the locking pin 132 during insertion of the insertion end 92 of the male ferrule 90 into the female ferrule, and the insertion slope of the tapered tip 94 automatically pushes the pin radially outward as the male ferrule advances toward connection. This eliminates the need to manually actuate the latch 130 during insertion.

Additionally, a frustoconical insertion stop 106 is defined intermediate the insertion end 92 and distal end 96. The insertion stop 106 is illustrated as tapered, defining a diametric enlargement from the cylindrical portion 98, which has the greatest diameter D2 of the insertion end 92, to the cylindrical distal end 96, which has the greatest diameter D3 of the male ferrule 90. The insertion stop 106 prevents the insertion end 92 from being inserted past the alignment plane of the locking pin 132. As a result, alignment of the locking pin 132 and lock hole 104 can be done only in one dimensional adjustment (rotational) once full insertion is achieved by registration of the insertion stop 106 with a terminal proximal edge 124 of the female ferrule 120. This is relatively simple to accomplish because there is a limit to how much the two can be rotated before alignment is achieved (less than a maximum of 360 degrees should align the lock pin with the lock hole).

Figure 8:
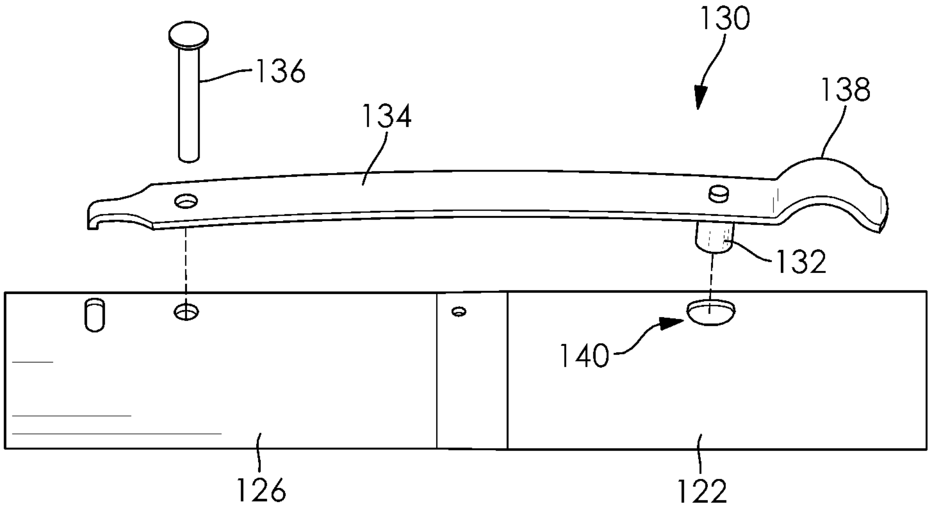
FIG. 8 is an exploded perspective view of the female ferrule of FIGS. 2 and 7.

The female ferrule 120 is illustrated as a generally hollow tubular structure, having a tubular cylindrical distal end 126 for mounting to a host structure in use and retained there by a laterally inserted fastener 136 (FIG. 8), illustrated as a bolt or rivet. Opposite the distal end 126, the female ferrule has a tubular cylindrical proximal end 122, with the terminal proximal edge 124 defining an opening that receives the insertion end 92 of the male ferrule 90 when inserted.

Figure 7:
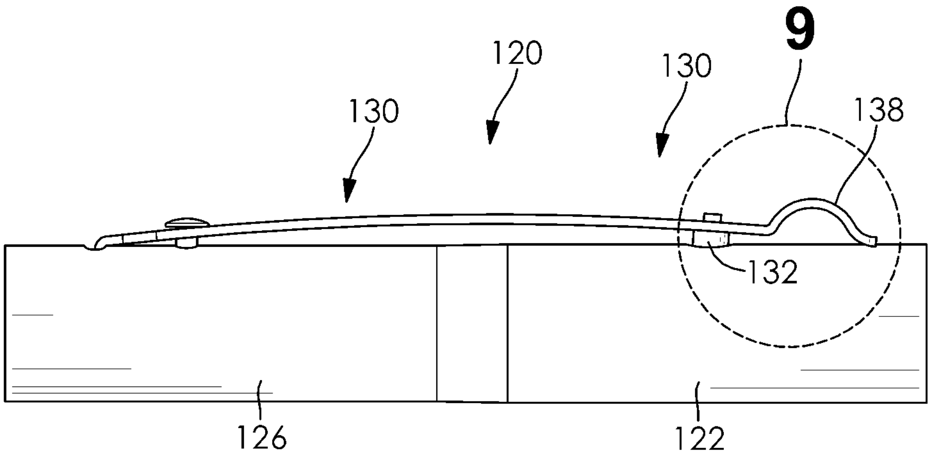
FIG. 7 is a side view of the female ferrule of FIG. 2.

The automatically locking and manually releasable latch 130 including the lock pin 132 (FIGS. 7-8) is carried by the female ferrule 120. The lock pin 132 is biased to automatically engage the lock hole 104 in the cylindrical portion 98 of the male ferrule 90 when the proximal insertion end 92 of the of the male ferrule is inserted into the proximal end 122 of the female ferrule 120. In particular, the latch 130 is illustrated as having a spring clip 134 (FIG. 8), illustrated as an elongate strip or leaf spring, with a rearward proximal end attached by the fastener 136 to the distal end 126 of the female ferrule 120. A forward distal end portion 138 of the spring clip 134 carries the lock pin 132, and biases the lock pin into a locking position, at which the lock pin is extended through a clearance hole 140 (FIG. 8) through the wall of the tubular proximal end 122 of the female ferrule 120. During insertion of the proximal insertion end 92 of the male ferrule 90 into the tubular proximal end 122 of the female ferrule 120, the insertion slope of the tapered tip 94 of the male ferrule 90 encounters the lock pin 132 and moves the lock pin, radially away from the central longitudinal axis of the female ferrule, from its locking position against the force of the spring clip 134.

Figure 9:
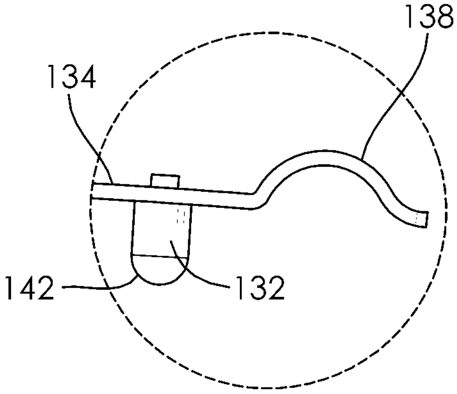
FIG. 9 is an enlarged side view of a proximal portion of the spring clip, indicated by dashed line 9 in FIG. 7.

The lock pin 132, in some embodiments, has an advantageously shaped contact terminus, such as chamfered or rounded, that facilitates sliding along the exterior of the insertion end 92 of the male ferrule 90. For example, a round contact end can allow the pin to ride along the exterior of the tapered tip 94 easily, which makes for a much more efficient and easier experience in use. FIG. 9 is an enlarged side view of a proximal portion of the spring clip 134, indicated by dashed line 9 in FIG. 7. FIG. 9 shows the profile of the lock pin 132, and in particular the rounded contact terminus 142 thereof, according to at least the illustrated advantageous embodiment. The rounded contact terminus 142, shown as hemispherical, facilitates sliding action of the lock pin 134 along the contacted insertion end 92 of the male ferrule 90 during insertion, in particular first contacting and sliding along the along the insertion slope of the tapered tip 94 as the lock pin 132 is displaced from the locking position, and then contacting and sliding along the cylindrical portion 98 as the male ferrule advances toward full insertion. The rounded contact terminus 142 also facilitates the lock pin 132 settling into the lock hole 104. Upon the lock pin 132 reaching the lock hole 104 in the cylindrical portion 98 of the male ferrule, at alignment of the clearance hole 140 and lock hole 104, the spring clip 134 returns the lock pin 132 to the locking position by pressing the lock pin into the lock hole 104 through the clearance hole 140, thereby automatically engaging the lock pin 132 with the lock hole 104 and locking the connection of the ferrules.

The inventive ferrule joint system, including the male ferrule 90, the female ferrule 120, and the automatic latch 130, provides an automatic and releasable engagement between the two mating ferrules (90, 120), without requiring expertise or much force to actuate a connection correctly. Locking and retention are maintained by the spring clip 134, which exerts enough force so the lock pin 132 will not be dislodge from the lock hole 104 unintentionally. For use to release the latch, and disjoin the ferrules, the forward distal terminus of the distal end portion 138 of the spring clip is formed as a hook by which the forward end of the spring clip can be pulled radially outward against the bias force thereof thereby disengaging the lock pin 132 from the lock hole 104. By such user action on the hook, the lock pin 132 can be withdrawn from the lock hole 104 and thereby allow the male ferrule 90 to be removed from the female ferrule 120.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A ferrule system comprising:

a male ferrule comprising:

an insertion end having a tapered tip and a cylindrical portion connected to the tapered tip, wherein the tapered tip is frustoconical in shape and diametrically increases from a leading edge thereof to the cylindrical portion thereby defining an insertion slope from the leading edge to the cylindrical portion, and wherein the cylindrical portion defines a greatest diameter of the insertion end;

an insertion stop connected to the cylindrical portion of the insertion end opposite the tapered tip of the insertion end; and a second end connected to the insertion stop opposite the cylindrical portion of the insertion end and configured for mounting the male ferrule onto a first host structure wherein the second end of the male ferrule is cylindrical and defines a greatest diameter of the male ferrule, a female ferrule configured to receive the insertion end of the male ferrule, the female ferrule having a terminal proximal edge that abuts the insertion stop of the male ferrule at full insertion of the insertion end into the female ferrule;

a lock pin by which the male ferrule and female ferrule are automatically locked into coupling at full insertion of the insertion end, the lock pin comprising a rounded contact terminus configured to slide along the insertion slope of the tapered tip as the male ferrule advances toward full insertion of the insertion end into the female ferrule; and a spring biasing the lock pin into a locking position, wherein, during insertion of the insertion end of the male ferrule into the female ferrule, the insertion slope of the tapered tip of the male ferrule automatically moves the lock pin radially outward from the locking position against a force of the spring as the male ferrule advances, wherein the male ferrule comprises a lock hole for receiving the lock pin in the locking position upon full insertion of the insertion end into the female ferrule.

2. The ferrule system of claim 1, wherein the contact terminus is hemispherical.

3. The ferrule system of claim 1, wherein the lock hole is defined in the cylindrical portion of the insertion end of the male ferrule.

4. The ferrule system of claim 3, wherein the spring comprises a spring clip attached to the female ferrule, the spring clip carrying the lock pin.

5. The ferrule system of claim 4, wherein the female ferrule comprises a clearance hole through which the lock pin is extended in the locking position thereof.

6. The ferrule system of claim 1, wherein the female ferrule comprises a distal end opposite the terminal proximal edge, the distal end configured for mounting to a second host structure.

7. The ferrule system of claim 6, wherein the female ferrule is hollow and tubular.

8. The ferrule system of claim 6, wherein the female ferrule comprises a tubular cylindrical proximal end opposite the distal end.

9. The ferrule system of claim 8, wherein the tubular cylindrical proximal end comprises the terminal proximal edge.

* * * * *